(12) United States Patent
Kato et al.

(10) Patent No.: US 7,914,837 B2
(45) Date of Patent: Mar. 29, 2011

(54) PROCESS FOR PRODUCING HYDRATED OILY BASE FOOD

(75) Inventors: Masaharu Kato, Izumisano (JP); Toshitaka Okawauchi, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 733 days.

(21) Appl. No.: 10/567,371

(22) PCT Filed: Aug. 6, 2004

(86) PCT No.: PCT/JP2004/011349
§ 371 (c)(1), (2), (4) Date: Feb. 7, 2006

(87) PCT Pub. No.: WO2005/016019
PCT Pub. Date: Feb. 24, 2005

(65) Prior Publication Data
US 2006/0257545 A1    Nov. 16, 2006

(30) Foreign Application Priority Data
Aug. 13, 2003 (JP) .................................. 2003-293115

(51) Int. Cl.
*A23G 1/00* (2006.01)
(52) U.S. Cl. ......... 426/593; 426/631; 426/660; 426/473
(58) Field of Classification Search .................. 426/659, 426/602, 660, 631, 531, 560, 590, 593, 468, 426/473; 99/452, 457, 464
See application file for complete search history.

(56) References Cited

U.S. PATENT DOCUMENTS

| | | | | |
|---|---|---|---|---|
| 3,223,532 | A * | 12/1965 | Pinkalla et. al. | 426/602 |
| 5,266,348 | A * | 11/1993 | Zumbe et al. | 426/660 |
| 5,464,649 | A * | 11/1995 | St. John et al. | 426/660 |
| 5,505,982 | A * | 4/1996 | Krawczyk et al. | 426/660 |
| 5,637,344 | A * | 6/1997 | Carpenter et al. | 426/631 |
| 6,024,789 | A * | 2/2000 | Kwan et al. | 106/460 |
| 6,221,422 | B1 * | 4/2001 | Kruger et al. | 426/631 |
| 6,296,891 | B1 * | 10/2001 | Zumbe et al. | 426/631 |
| 6,773,744 | B1 * | 8/2004 | Ward et al. | 426/659 |
| 2004/0101613 | A1 * | 5/2004 | Levi | 426/601 |

FOREIGN PATENT DOCUMENTS

| | | |
|---|---|---|
| CN | 1423525 | 6/2003 |
| JP | 52-021006 | 2/1977 |
| JP | 58-198243 | 11/1983 |
| JP | 63-222652 | 9/1988 |
| JP | 08-205773 | 8/1996 |
| JP | 08-231981 | 9/1996 |
| JP | 09-313145 | 12/1997 |
| JP | 10-099022 | 4/1998 |
| WO | 01/41583 | 6/2001 |

OTHER PUBLICATIONS

English translation of Office Action issued Apr. 7, 2010 in Chinese Patent Application No. 200480029603.9 corresponding to the present application.
Singapore Office Action dated Oct. 1, 2010 issued in the corresponding Singapore Patent Application No. 2008059750 (in the English language).
English translation of Office Action dated Sep. 20, 2010, issued in Chinese Patent Application No. 200480029603.9 corresponding to present U.S. Application.

* cited by examiner

*Primary Examiner* — Drew E Becker
*Assistant Examiner* — Preston Smith
(74) *Attorney, Agent, or Firm* — Wenderoth, Lind & Ponack, L.L.P.

(57) ABSTRACT

Addition of a large amount of a food additive such as an emulsifier to a food is undesirable, since it is feared that not only the flavor of the food is damaged but also the secure sense for the qualities of the product and consumers' buying intention are worsened thereby. It is intended to provide a process for conveniently producing a hydrated oily base food such as a chocolate drink powder while reducing the content of an emulsifier. Namely, an oily base food having a high hydration nature can be produced even by using a small amount of an emulsifier by densely mixing a small amount of a hydrophilic material, which contains a hydrophilic emulsifier as the essential component, with an oil-containing material, or shaping an oil-containing material into flakes or a powder as the final product by roll refining.

7 Claims, No Drawings

PROCESS FOR PRODUCING HYDRATED OILY BASE FOOD

TECHNICAL FIELD

The present invention relates to a process for producing an oily base food having a high hydration nature by using a small amount of an emulsifier.

BACKGROUND ART

As is often the case with, for example, chocolate drink, it is difficult to dissolve or disperse a raw material having a high fat content in an aqueous medium such as cold water, boiling water or warmed milk. When such a material is simply added to or dispersed in the aqueous medium, insolubles are remained or settled, which causes separation and flotation of fats and oils. This is a problem.

Thus, various methods have been studied on techniques for dispersing and dissolving chocolate or its oily material in an aqueous medium.

As such methods, there are addition of a hydrophilic material such as an emulsifier to raw materials (see Patent Documents 1, 2 and 3), granulation by spraying an emulsifier mixture (see Patent Documents 4, 5, 6, 7 and 8), addition and kneading of a cyclodextrin to and in a cacao butter material (see Patent Document 9), and the like. However, these methods are mainly directed to provision of solubility in water to raw materials by using specific kinds of additives without considering treatment of the additives and their addition timing. Then, in many cases it is inevitable that a large amount of an emulsifier and a stabilizer are added during dissolution in water. In case of Patent Document 9, for example, the amount of a cyclodextrin and an emulsifier to be used reaches 0.3 fold by weight or more as large as a cacao butter material.

There is another method, wherein hydration can be attained by using a relatively small amount of an emulsifier (see Patent Document 10). However, in this method, it is essential to treat raw materials such as cacao mass and cocoa powder with alkaline water or hot water, thereby requiring a re-drying step. Then, this method is not simple and convenient, and is disadvantage in view of facilities and costs.

Patent Document 1: JP 61-141873 A (pages 1 to 7)
Patent Document 2: JP 8-205773 A (pages 1 to 5)
Patent Document 3: JP 2000-342183 A (pages 1 to 6)
Patent Document 4: JP 11-103780 A (pages 1 to 8)
Patent Document 5: JP 7-87893 A (pages 1 to 4)
Patent Document 6: JP 7-87892 A (pages 1 to 4)
Patent Document 7: JP 10-4883 A (pages 1 to 4)
Patent Document 8: JP 11-69945 A (pages 1 to 6)
Patent Document 9: JP 1-174362 A (pages 1 to 6)
Patent Document 10: JP 2-219543 A (pages 1 to 8)

DISCLOSURE OF THE INVENTION

Addition of a large amount of a food additive such as an emulsifier to a food is undesirable, since it is feared that not only the flavor of the food is damaged but also the secure sense for the qualities of the product and consumers' buying intention are worsened thereby. The object of the present invention is to provide a process for conveniently producing a hydrated oily base food while reducing the content of an emulsifier.

In order to achieve the above-mentioned object, the present inventors have studied intensively. As a result, they have found that an oily base food having a high hydration nature can be produced even by using a small amount of an emulsifier by densely mixing a small amount of a hydrophilic material, which contains a hydrophilic emulsifier as the essential component, previously with an oil-containing material, or shaping an oil-containing material into flakes or a powder as the final product by roll refining.

That is, the first aspect of the present invention is a process for producing a hydrated oily base food which comprises densely mixing a small amount of hydrophilic materials containing a hydrophilic emulsifier as an essential component with an oil-containing material (claim 1), and the second aspect of the present invention is a process for producing a hydrated oily base food which comprises shaping an oil-containing material into flakes or a powder as a final product by roll refining.

Herein, the oil-containing material is cacao mass, cocoa powder, or whole powdered milk or any of them to which fats are added; the amount of the hydrophilic emulsifier to be used or to be optionally used is within the range of 0.05 to 10% relative to the oil-containing material; and HLB of the hydrophilic emulsifier is 5 or more.

In the above-mentioned first aspect of the present invention, preferably, the amount of the hydrophilic materials to be densely mixed with the oil-containing material is less than 30% relative to the oil-containing material; and examples of the hydrophilic materials except the hydrophilic emulsifier among the hydrophilic materials densely mixed with the oil-containing material include a thickening polysaccharide, a gelling agent or a pH adjustor. The dense mixing is performed by using one or more kinds of a conching machine, a kneader, a ball mill and a mixer; and the dense mixing is preferably performed with warming. The residual hydrophilic materials can be added after the dense mixing; and the hydrophilic materials used in large amounts such as saccharides, for example, sugar and powdered skim milk are preferably added at this time. Shaping of the resulting mixture into flakes or a powder is preferably performed after the dense mixing or further addition of the residual hydrophilic materials.

In the present invention, all percents (%) and parts are by weight unless otherwise stated.

According to the present invention, the content of an emulsifier can be reduced and a hydrated oily base food can be simply and conveniently obtained. The present invention is advantageous because the damage of flavor of a food due to an emulsifier can be avoided because amounts of food additives such as an emulsifier to be used can be decreased.

BEST MODE FOR PERFORMING THE INVENTION

As described above, the first aspect of the present invention is a process for producing a hydrated oily base food which comprises densely mixing a small amount of hydrophilic materials containing a hydrophilic emulsifier as an essential component with an oil-containing material.

When the amount of the hydrophilic emulsifier contained in the small amount of hydrophilic materials becomes larger, a higher hydration nature can be provided. However, addition of an unnecessary excess amount of the emulsifier has no superiority in view of causing a bad flavor of a food. Then, it is important to add a small amount of the hydrophilic emulsifier. That is, desirably, the amount of the emulsifier to be added is about 0.05 to 10%, preferably about 0.1 to 3%, more preferably about 0.2 to 1.5% relative to the oil-containing material. When the amount is too small, desired advantages are hardly obtainable. On the other hand, when the amount is too large, the object of the present invention is not attained.

A higher HLB of the hydrophilic emulsifier can provide a higher hydration nature. Then, HLB is preferably 5 or more, more preferably 12 or more. However, a lipophilic emulsifier having a lower HLB than this may also be used, and lecithin may be used together.

The emulsifier is not particularly limited to a specific kind, and examples thereof include sucrose fatty acid esters, glycerin fatty acid esters, polyglycerine fatty acid esters, sorbitan fatty acid esters, propylene glycol fatty acid esters, and the like.

For permitting the hydrophilic emulsifier which is present in a small amount in the hydrophilic materials as an essential component to effectively act on the oil-containing material, it is desirable that the amount of the hydrophilic materials to be densely mixed with the oil-containing material is as small as possible, preferably less than 30%, more preferably less than 10% relative to the oil-containing material, because the hydrophilic emulsifier acts more preferentially on materials which is more hydrophilic than the oil-containing material, when the materials is present in a larger amount together with the oil-containing material.

As other hydrophilic materials to be used together with the essential hydrophilic emulsifier, a thickening polysaccharide, a gelling agent or a pH adjustor can be used so as to improve the hydration nature of the oily base food. However, since addition of an unnecessary excess amount of these materials rather deteriorates the desired hydration nature of the oil-containing material provided by the emulsifier, their amount to be added should be a minimum required amount.

Examples of the thickening polysaccharides include xanthan gum, tamarind gum, gum arabic, guar gum, locust bean gum, etc., and examples of the gelling agent include gellan gum, alginic acid, sodium argininate, carrageenan, agar, gelatin, pectin, etc. Examples of the pH adjustor include organic acids such as citric acid, DL-malic acid, etc., and salts thereof, carbonates such as sodium carbonate, etc., phosphoric acids such as phosphoric acid, etc., bicarbonates such as sodium bicarbonate, etc., and the like. In view of increase in a hydration nature, the pH is adjusted so that the pH is within the range of 6 to 8, preferably 6.5 to 7.5 at the time of hydration of an oily base food.

The mixing step of a small amount of hydrophilic materials with an oil-containing material is not specifically limited as far as the dense mixing is performed. For example, the mixing is desirably performed by using one of a conche (conching machine), a kneader, a ball mill and a mixer, or an appropriate combination thereof. For mixing the fats in the oil-containing material and the emulsifier, the above-mentioned dense mixing is preferably performed with warming to a temperature at which the fats melt at least partially, e.g., normally, in a range of 30 to 70° C., depending on the oil-containing material and the amount and physical properties of the fats.

The oil-containing material densely mixed with a small amount of hydrophilic materials is appropriately selected according to the desired hydrated oily base food. A typical example of the food of the present invention is chocolate drink and, in such a case, cacao mass, cocoa powder, whole powdered milk or one of them to which fats are added is used as the oil-containing material. In particular, for obtaining chocolate drink with a good flavor, the main components of the oil-containing material are preferably cacao mass, cocoa powder and cocoa butter as fats (cacao mass is obtained by grinding albumen (nibs) of roasted cacao beans. Cocoa or cocoa powder is obtained by compressing the cacao mass to remove a part of the oily component. The oily component thus removed corresponds to cocoa butter.).

However, for example, when drink of white chocolate or the like is desired regardless of the original flavor of chocolate, whole powdered milk, cheese powder, and, if necessary, hard butter and other fats can appropriately used as the oil-containing material instead of cacao mass and cacao butter. The term "chocolate" used herein includes chocolate and other chocolate products such as no tempering-type chocolate and so-called chocolate-like food, for example, strawberry flavored chocolate, powdered green tea flavored chocolate, etc., regardless of the definitions by laws, standards and regulations.

In the present invention, however, when the oil-containing material contains only oily components such as cacao butter and hard butter, the effect of dense mixing with the hydrophilic emulsifier is scarcely expected and it is difficult to decrease the amount of the emulsifier. Then, it is important to use the oil-containing material which contains, in addition to the fats, a component other than fats such as cacao mass, cocoa powder or whole powdered milk. A material which contains no fats or fewer fats such as powdered skim milk and cocoa powder is preferably used as the hydrophilic materials mentioned hereinafter rather than the oil-containing material.

Examples of the desired hydrated oily base food include, in addition to chocolate drink, curry roux with an improved hydration nature, nuts drink and whole soymilk drink, and examples of the oil-containing material for such food other than chocolate drink include a mixture of roasted wheat flour and beef tallow, nuts paste, whole soymilk powder, etc.

The properties of a mixture obtained by the dense mixing vary depending on the fats content during the dense mixing step of a small amount of hydrophilic materials with the oil-containing material. When a mixture is in the shape of dough, the emulsifier can be uniformly dispersed because of application of shear force. Then, in case of using a material having a high fat content such as cacao mass in the dense mixing, hydrophilic materials can be mixed with cacao mass alone because the mixture readily forms dough. On the other hand, in case of using cocoa powder or whole powdered milk which itself has not so high fat content, preferably, an appropriate amount of fats are added to facilitate formation of dough.

The fats to be used include animal and vegetable fats and hydrogenated fats thereof. Further, these fats subjected to various chemical and physical treatments can also be used. They can be used alone or in combination of two or more thereof. Examples of such fats include various animal and vegetable fats such as soybean oil, cottonseed oil, corn oil, safflower oil, olive oil, palm oil, rapeseed oil, rice bran oil, sesame oil, kapok oil, coconut oil, palm kernel oil, cacao butter, milk fat, lard, fish oil, whale oil, and processed fats thereof such as hydrogenated fats, fractionated fats and interesterified fats thereof.

As described above, preferably, the amount of hydrophilic materials used during the dense mixing are as small as possible. However, when more hydrophilic materials are required in view of the final blending of the desired food, the residual hydrophilic materials can be added after the above-mentioned dense mixing.

In particular, the hydrophilic emulsifier required to selectively act on the oil-containing material, and a thickening polysaccharide, a gelling agent and a pH adjustor for improving the function thereof are effectively added in the required amounts during the dense mixing, while it is desirable that hydrophilic materials to be used in relatively large amounts are added rather as the rest after the dense mixing.

Examples of the above-mentioned residual hydrophilic materials include sugar and powdered skim milk, and saccharides other than sugar such as monosaccharides, oligosaccharides, sugar alcohols, dextrin, starch syrup, etc.

While the hydrophilic emulsifier is mixed with all other materials in a conventional production process, in the present invention, a two-stage step is employed so that the residual hydrophilic materials are added after the step for densely mixing a small amount of hydrophilic materials with the oil-containing material. Then, sometimes, the step for densely mixing a small amount of hydrophilic materials with the oil-containing material is referred to as the "pretreatment step" hereinafter.

After the above-mentioned step of dense mixing (pretreatment step) or further addition of the residual hydrophilic materials, a roll refining step is performed in the same manner as the conventional chocolate production, or another step is employed for appropriately shaping into flakes or a powder. Then, the flakes or powder are subjected to conching in the same manner as the conventional chocolate production to form paste. Further, the paste is subjected to shaping by molding, etc., and cooling. Thus, it is processed into blocks. The hydrated oily base food thus obtained in the shape of paste, melt or blocks has a more improved hydration nature than a hydrated oily base food in paste or blocks obtained by a conventional process. Further, by using such a food, an oily food having favorable meltability in the mouth can be obtained.

However, in a more preferred embodiment of the present invention, it is desirable to only perform the steps for shaping into flakes or powder by the above-mentioned roll refining or another appropriate step for shaping into flakes or a powder in view of advantageous effects on a hydration nature, i.e., solubility and dispersibility in water. Although a method of shaping into flakes or a powder is not specifically limited, the processing by roll refining is preferable because the processing equipment is often employed in the conventional production of oily food, no additional equipment is required, and a large amount of materials can be processed in a short period of time. Then, it will be explained in detail with respect to the second aspect of the present invention.

That is, the second aspect of the present invention is a process for producing a hydrated oily base food which comprises shaping an oil-containing material into flakes or a powder as a final product by roll refining. According to this process, an amount of an emulsifier can be reduced even without performing the dense mixing step (pretreatment step) which is essential to the above-mentioned first aspect of the present invention to simply and conveniently obtain a hydrated oily base food.

In this aspect of the present invention, typical examples of the oil-containing material include cacao mass, cocoa powder, whole powdered milk or one of them to which fats are added in the same manner as the first aspect of the present invention. In the second aspect of the present invention, the hydrophilic emulsifier is also preferably used and the pretreatment step for densely mixing with the oil-containing material is preferably employed. However, the use of the hydrophilic emulsifier and the pretreatment step are not essential. When using the hydrophilic emulsifier, the emulsifier is preferably used in an amount of 0.05 to 10% relative to the oil-containing material, and HLB of the emulsifier is suitably 5 or more.

Since no further conching step is employed in this second aspect of the present invention, preferably, the oil-containing material is shaped into flakes or a powder as the final product without further addition of fats, thereby improving a hydration nature in an aqueous medium, and providing a product having a low oil component as compared with conventional chocolate. Such a product meets the preference tendency in recent years. In case of an extremely high oil content, sometimes, such a phenomenon as "slip" of particles and a roll occurs during roll refining, which results in insufficient roll refining. Then, in case of obtaining roll flakes by roll refining, the oil content of a material to be loaded is desirably about 30% or less, preferably 16 to 28%, more preferably 24 to 26%.

Other conditions of roll refining may be the same as those of conventional roll refining of oily food such as chocolate, etc. In a roll refining step, particles of a loaded material is pulverized into finely divided particles, thereby increasing the surface area. Then, an oil component which has formed a continuous phase until then can not sufficiently "wrap" or cover the particles, and the material loses fluidity to apparently become powdery or flakes wherein powdery particles are weakly bonded to each other (hereinafter, sometimes referred to as "roll flakes").

As described hereinabove, the oily base food having a superior hydration nature can be obtained by performing the first or the second aspect of the present invention or both.

The present invention will be explained in detail hereinafter.

The following Examples further explain the present invention in detail, but are not to be construed to limit the spirit of the present invention. In Examples, all parts are by weight.

Example 1

To 50 parts of cacao mass adjusted to 60° C. were added 0.6 part of sucrose stearate ("RYOTO Sugar Ester S-1670", HLB=16, manufactured by Mitsubishi-Kagaku Foods Corporation) and 0.2 part of sodium bicarbonate, and the mixture was subject to the "pretreatment step" for mixing by stirring with a conche for 1 hour while maintaining at 60° C. To the mixture thus treated was added 50.0 parts of sugar, and the resulting mixture was subject to refining by a roll refiner ("Three-roll mill SDY-300", manufactured by Buhler Inc.) under such conditions that the particle size became about 20 μm to obtain roll flakes.

Twenty-fold volume of boiling water (90° C.) was poured into the roll flakes obtained to determine solubility or dispersibility in water by observing the amount of a precipitate, the solid content and oil off (a state where fine oil droplets are spotted on a liquid surface) with time. The amount of a precipitate was measured by stirring the mixture of boiling water and the roll flakes with a stirring rod to prepare a dispersion and then pouring it into a graduated cylinder. The larger amount of a precipitate means lower solubility or dispersibility in water. The solid content was determined by applying 2 to 3 g of the dispersion to Microwave moisture/solids analyzer (LABWAVE9000 CEM) and measuring the weight difference before and after evaporation of moisture therefrom. The higher solid content means that more solids are dispersed in the dispersion, indicating higher solubility or dispersibility. The oil off was determined visually by observing the surface of the dispersion 24 hours after treatment with boiling water. Less oil off means higher solubility or dispersibility. These results are shown in Table 1.

Examples 2 and 3

To 50.0 parts of cacao mass adjusted to 60° C. were added 50.0 parts of sugar, 0.6 part of sucrose stearate (RYOTO Sugar Ester S-1670: HLB=16) and 0.2 part of sodium bicarbonate without the "pretreatment step", and the mixture was subject to refining by a roll refiner under the same conditions as those in Example 1 (Example 2). Twenty-fold volume of boiling water (90° C.) was poured into the roll flakes obtained and the resulting mixture was evaluated according to the same manner as that in Example 1.

According to the same manner as that in Example 2, roll flakes (Example 3) was obtained except that the emulsifier was not added, and twenty-fold volume of boiling water (90° C.) was poured into the roll flakes and the resulting mixture was evaluated according to the same manner. The results are summarized in Table 1.

TABLE 1

Blending compositions and evaluation

| | Example 1 | Example 2 | Example 3 |
|---|---|---|---|
| Cacao mass | 50.0 | 50.0 | 50.0 |
| Sodium bicarbonate | 0.2 | 0.2 | 0.2 |
| Sucrose stearate (HLB = 16) | 0.6 | 0.6 | — |
| Sugar | 50.0 | 50.0 | 50.0 |
| Performance of pretreatment step | Performed | Not performed | — |
| Shape | Flakes | Flakes | Flakes |
| Precipitate after 0.5 hour [as compared with Example 3] | 0.10 | 0.55 | 1.00 |
| Precipitate after 24 hours [as compared with Example 3] | 0.55 | 0.77 | 1.00 |
| Solid content after 24 hours [as compared with Example 3] | 1.21 | 1.10 | 1.00 |
| Oil off | None | Little | Much |

The highest solubility or dispersibility in water was observed in Example 1 in which cacao mass was previously subject to the "pretreatment step" with the emulsifier. The solubility or dispersibility in water of Example 2 in which the "pretreatment step" was not performed was between those of Examples 1 and 3. The lowest solubility or dispersibility in water was observed in Example 3 in which no emulsifier was added.

Examples 4, 5, 6, 7 and 8

To 50.0 parts of cacao mass adjusted to 60° C. were added 0.2 part of sodium bicarbonate and 0.6 part of sucrose stearate ("RYOTO Sugar Ester S-1670": HLB=16, manufactured by Mitsubishi-Kagaku Foods Corporation [Example 4]), decaglycerin mono-oleate ("SY-Glyster MO-7S": HLB=12.9, manufactured by SAKAMOTO YAKUHIN KOGYO CO., LTD. [Example 5]), tetraglycerin oleate ("SY-Glyster MO-3S": HLB=8.8, manufactured by SAKAMOTO YAKUHIN KOGYO CO., LTD. [Example 6]), sucrose stearate ("RYOTO Sugar Ester S-570": HLB=5.0, manufactured by Mitsubishi-Kagaku Foods Corporation [Example 7]), or sorbitan monooleate ("EMASOL 0-80V": HLB=4.3, manufactured by Kao Corporation [Example 8]) as an emulsifier having a different HLB. The resulting mixture was subject to the "pretreatment step" for mixing by stirring for 1 hour while maintaining at 60° C.

To the mixture thus treated was added 50.0 parts of sugar, and the mixture was subject to refining by a roll refiner under the same conditions as those in Example 1 to obtain roll flakes (see blending compositions of respective Examples in Table 2). Ten-fold volume of boiling water (90° C.) was poured into the roll flakes obtained to determine solubility or dispersibility in water according to the same manner as that in Example 1. These results are shown in Table 2.

Example 9

According to the same manner and conditions, roll flakes were obtained except that the emulsifier was not added. Ten-fold volume of boiling water (90° C.) was poured into the roll flakes and the resulting mixture was evaluated according to the same manner. This was referred to as Example 9. The results are summarized in Table 2.

TABLE 2

Blending compositions and evaluation

| | Example 4 | Example 5 | Example 6 | Example 7 | Example 8 | Example 9 |
|---|---|---|---|---|---|---|
| Cacao mass | 50.0 | 50.0 | 50.0 | 50.0 | 50.0 | 50.0 |
| Sodium bicarbonate | 0.2 | 0.2 | 0.2 | 0.2 | 0.2 | 0.2 |
| Sucrose stearate | 0.6 | | | | | |
| Decaglycerol mono-oleate | | 0.6 | | | | |
| Tetraglycerol oleate | | | 0.6 | | | |
| Sucrose stearate | | | | 0.6 | | |
| Sorbitan mono-oleate | | | | | 0.6 | |
| Sugar | 50.0 | 50.0 | 50.0 | 50.0 | 50.0 | 50.0 |
| HLB | 16.0 | 12.9 | 8.8 | 5.0 | 4.3 | |
| Amount of precipitate after 0.5 hour (as compared with Example 9) | 0.00 | 0.11 | 0.14 | 0.46 | 0.79 | 1.00 |
| Amount of precipitate after 2 hours (as compared with Example 9) | 0.19 | 0.45 | 0.45 | 0.59 | 0.98 | 1.00 |
| Solid content (as compared with Example 9) | 1.24 | 1.10 | 1.07 | 1.04 | 0.99 | 1.00 |

It was confirmed that high solubility or dispersibility was generally observed in Examples in which the "pretreatment step" was performed and, in particular, higher solubility or dispersibility was provided by higher HLB.

In the hydrophilic emulsifiers used in Examples 4 to 9, improvement of solubility or dispersibility by performing the "pretreatment step" was also confirmed visually as compared with that without the "pretreatment step".

Example 10

To 50.0 parts of cacao mass adjusted to 60° C. was added 0.6 part of carrageenan ("CARRAGEENAN CS3", manufactured by San-Ei Gen F.F.I., Inc. [Example 10]) as a stabilizer, and the mixture was subject to the "pretreatment step" for mixing by stirring for 1 hour while maintaining at 60° C. To the mixture thus treated was added 50.0 parts of sugar and the resulting mixture was subject to refining by a roll refiner under the same conditions as those in Example 1 to obtain roll flakes (see blending composition in Table 3). Ten-fold volume of water (20° C.) or boiling water (90° C.) was poured into the roll flakes obtained to examine solubility or dispersibility in water by comparing the thickness of the resulting dispersion. Similarly, oil off (a state where fine oil droplets are spotted on a liquid surface) was compared. These results are shown in Table 3.

Examples 11 and 12

Examples 11 and 12 were performed for examining the interaction between an emulsifier and a stabilizer. In Example 11, 0.6 part of tetraglycerin oleate ("SY-Glyster MO-3S": HLB=8.8, manufactured by SAKAMOTO YAKUHIN KOGYO CO., LTD. [Example 11]) was added as an emulsifier to 50.0 parts of cacao mass adjusted to 60° C., and the mixture was subject to the "pretreatment step" for 1 hour while maintaining at 60° C. In Example 12, 0.6 part of the above-mentioned tetraglycerin oleate and 0.6 part of carrageenan ("CARRAGEENAN CS3", manufactured by San-Ei Gen F.F.I., Inc. [Example 12]) were added to cacao mass and the mixture was subject to the "pretreatment step" for 1 hour while maintaining at 60° C. To the cacao mass thus treated was added 50.0 parts of sugar and roll flakes were obtained from the resulting mixture according to the same conditions and manner as those in Example 10 (see blending compositions of respective Examples in Table 3). Ten-fold volume of water (20° C.) or boiling water (90° C.) was poured into the roll flakes obtained to examine solubility or dispersibility in water according to the same manner as that in Example 10. These results are shown in Table 3.

Example 13

According to the same manner as that in Example 10, roll flakes were obtained except that the stabilizer was not added. Ten-fold of water (20° C.) or boiling water (90° C.) was poured into the roll flakes obtained. This was referred to as Example 13. The results are summarized in Table 3.

TABLE 3

Blending compositions and evaluation

| | Example 10 | Example 11 | Example 12 | Example 13 |
|---|---|---|---|---|
| Cacao mass | 50.0 | 50.0 | 50.0 | 50.0 |
| Sodium bicarbonate | 0.2 | 0.2 | 0.2 | 0.2 |
| Carrageenan | 0.6 | | 0.6 | |
| Tetraglycerol oleate (HLB = 8.8) | | 0.6 | 0.6 | |
| Sugar | 50.0 | 50.0 | 50.0 | 50.0 |

TABLE 3-continued

Blending compositions and evaluation

| | Example 10 | Example 11 | Example 12 | Example 13 |
|---|---|---|---|---|
| Thickness of dispersions 0.5 hour after addition of water (in order of thickness) | 3 | 2 | 1 | 4 |
| Thickness of dispersions 72 hours after addition of boiling water (in order of thickness) | 3 | 1 | 1 | 4 |
| Oil off | Little | None | None | Much |

Solubility or dispersibility was increased by the treatment with a stabilizer such as the thickening polysaccharide. For further increasing the effect of the stabilizer, a combination of a stabilizer with an emulsifier was considered to be desirable.

Examples 14 and 15

To 50.0 parts of cacao mass was added 50.0 parts of sugar, and the mixture was subject to refining by a roll refiner under the same conditions as those in Example 1 to obtain roll flakes. Ten-fold volume of boiling water (90° C.) was poured into the roll flakes obtained to examine solubility or dispersibility in water from the amount of a precipitate (Example 14). A smaller amount of a precipitate shows higher solubility or dispersibility.

According to the same manner as that in Example 14, a dispersion was obtained except that 0.2 part of sodium bicarbonate (sodium bicarbonate, manufactured by ASAHI GLASS CO., LTD.) was added to boiling water. This was referred to as Example 15 and solubility or dispersibility in water was examined (see blending compositions of respective Examples in Table 4).

Examples 16 and 17

According to the same manner as that in Example 14, a dispersion was obtained except that 0.6 part of sucrose stearate ("RYOTO Sugar Ester S-1670": HLB=16, manufactured by Mitsubishi-Kagaku Foods Corporation) was added to the boiling. This was referred to as Example 16. Similarly, a dispersion was obtained except that 0.6 part of sucrose stearate and 0.2 part of sodium bicarbonate were added to boiling water. This was referred to as Example 17. According to the same manner as that in Example 14, solubility or dispersibility in water was examined (see blending compositions of respective Examples in Table 4).

Example 18

To 50.0 parts of cacao mass adjusted to 60° C. were added 0.6 part of sucrose stearate ("RYOTO Sugar Ester S-1670", HLB=16, manufactured by Mitsubishi-Kagaku Foods Corporation) and 0.2 part of sodium bicarbonate (sodium bicarbonate, manufactured by ASAHI GLASS CO., LTD.), and the mixture was subject to the "pretreatment step" for mixing by stirring for 1 hour with a conche while maintaining at 60° C. To the cacao mass mixture thus treated was added 50.0 parts of sugar, and the mixture was subject to refining by a roll refiner under the same conditions to obtain roll flakes. Ten-fold volume of boiling water (90° C.) was poured into the roll flakes obtained to examine solubility or dispersibility in water from the amount of precipitate (Example 18).

TABLE 4

Blending compositions and evaluation

|  | Example 14 | Example 15 | Example 16 | Example 17 | Example 18 |
|---|---|---|---|---|---|
| Cacao mass | 50.0 | 50.0 | 50.0 | 50.0 | 50.0 |
| Sugar | 50.0 | 50.0 | 50.0 | 50.0 | 50.0 |
| Sodium bicarbonate |  | 0.2 |  | 0.2 | 0.2 |
| Sucrose stearate (HLB = 16) |  |  | 0.6 | 0.6 | 0.6 |
| Additives | None | Addition to boiling water | Addition to boiling water | Addition to boiling water | Pretreatment |
| Amount of precipitate after 72 hours (as compared with Example 14) | 1.0 | 1.0 | 0.9 | 0.8 | 0.4 |

While the pH adjustor such as sodium bicarbonate alone did not contribute so much to improvement in solubility or dispersibility, it was confirmed that a combination thereof with a hydrophilic emulsifier (here, sugar ester) was effective for improving solubility or dispersibility. Further, as seen from Examples 17 and 18, the treatment of additives beforehand notably improved solubility or dispersibility.

As with the system of Examples 14 to 17 where the additives were added to boiling water, in the system of Example 18 where the pretreatment was performed, it was also confirmed visually that solubility or dispersibility was more improved by using a combination of the pH adjustor with a hydrophilic emulsifier rather than using the pH adjustor alone.

Example 19

The effect was inspected in a system similar to the practical chocolate production, wherein fats were added to roll flakes and the mixture was subjected to conching.

To 43.0 parts of cacao mass adjusted to 60° C. was added 0.5 part of sucrose stearate ("RYOTO Sugar Ester S-1670", HLB=16, manufactured by Mitsubishi-Kagaku Foods Corporation), and the mixture was subject to the "pretreatment step" for mixing by stirring for 1 hour while maintaining at a temperature of 90° C. To the cacao mass thus treated was added 42.0 parts of sugar, and the mixture was treated according to the same manner as that in Example 1 to obtain roll flakes. The roll flakes thus obtained was added 15 parts of cocoa butter, and the mixture was subjected to conching for 2 hours, and then to tempering according to a conventional method. The resulting chocolate was cast in 7 g-molds and cooled to obtain chocolate in blocks (see blending composition in Table 5). In to the chocolate thus obtained was poured 6.7-fold volume of boiling water (90° C.) to determine solubility or dispersibility in water from the amount of a precipitate. The results are shown in Table 5.

Comparative Example 1

Chocolate was produced in the same blending and conditions as those in Example 19 except that the emulsifier was not added to determine solubility or dispersibility in water according to the same manner as that in Example 19. This was referred to as Comparative Example 1. The results are summarized in Table 5.

Comparative Example 2

Chocolate was produced in the same blending and conditions as those in Comparative Example 1, and 6.7-fold volume of boiling water (90° C.) and 0.5 part of sucrose stearate ("RYOTO Sugar Ester S-1670", HLB=16, manufactured by Mitsubishi-Kagaku Foods Corporation) were added to the chocolate obtained to determine solubility or dispersibility in water according to the same manner as that in Example 19. The results are summarized in Table 5.

TABLE 5

Blending compositions and evaluation

|  | Example 19 | Comparative Example 1 | Comparative Example 2 |
|---|---|---|---|
| Cacao mass | 43.0 | 43.0 | 43.0 |
| Sodium bicarbonate | 0.2 | 0.2 | 0.2 |
| Sucrose stearate (HLB = 16) | 0.6 | — | 0.6 |
| Sugar | 42.0 | 42.0 | 42.0 |
| Cocoa butter | 15.0 | 15.0 | 15.0 |
| Addition timing of emulsifier | During pretreatment step | None | During boiling water treatment |
| shape | Blocks | Blocks | Blocks |
| Amount of precipitate (as compared with Comparative Example 1) | 0.70 | 1.00 | 1.02 |

The highest solubility or dispersibility was observed in the product in which the emulsifier was added during the "pretreatment step" beforehand. There was little difference in solubility or dispersibility between chocolate in which the emulsifier was added before pouring boiling water and that without the emulsifier. It has been confirmed from these results that the "pretreatment step" improves solubility and dispersibility in water also with regard to chocolate.

Comparative Example 3 and Example 20

To 50.0 parts of cacao mass adjusted to 60° C. was added 50.0 parts of sugar, and the mixture was subject to a roll refiner under the same conditions as those in Example 1. Then, the mixture was stirred with a conche while maintaining at 60° C. to return to paste, followed by cooling to obtain chocolate in blocks. Ten-fold volume of boiling water (90° C.) was poured into the chocolate in blocks thus obtained to confirm the state of a solution or a dispersion, and a precipitate. Thereafter, the solid content was measured according to the same manner as that in Example 1. A higher solid content means higher solubility or dispersibility in water. These results are shown in Table 6.

Further, 10-fold volume of boiling water (90° C.) was poured in to the roll flakes before being returned to paste in the above blending of Comparative Example 3. This was referred to as Example 20. The results are summarized in Table 6.

Example 21

According to the same manner and blending as those in Example 1, roll flakes were obtained. Ten-fold volume of boiling water (90° C.) was poured into the roll flakes, followed by evaluating solubility or dispersibility in water according to the same manner as that in Comparative Example 3 and Example 20. These results are shown in Table 6.

TABLE 6

Blending compositions and evaluation

|  | Comparative Example 3 | Example 20 | Example 21 |
|---|---|---|---|
| Cacao mass | 50.0 | 50.0 | 50.0 |
| Sodium bicarbonate | 0.2 | 0.2 | 0.2 |
| Sucrose stearate (HLB = 16) | — | — | 0.6 |
| Sugar | 50.0 | 50.0 | 50.0 |
| Performance of pretreatment step | Not performed | Not performed | Performed |
| Shape | Blocks | Flakes | Flakes |
| State immediately after pouring boiling water | Lumps and suspended matters remaining | Some suspended matters | Completely dissolved |
| State 30 minutes after boiling water treatment | Spotted much sediment precipitated | Spotted | Uniform |
| Solid content in 2 hours [as compared with Comparative Example 3] | 1.00 | 1.75 | 2.10 |

Naturally, the highest hydration nature was observed in the flakes of Example 21 in which cacao mass was previously subject to the "pretreatment step" by the emulsifier. In Example 20, quick dissolution or dispersion by boiling water was also observed even though the pretreatment was not performed, though it was not comparable to Example 21.

On the other hand, lumps remained even though stirring was continued for a few minutes in the blocks of Comparative Example 3. The solid content of the flakes of Example 20 in which no pretreatment was performed exhibited approximately twice as high as that of the blocks of Comparative Example 3. In view of this result, it is considered that flakes or a powder having a larger surface area is preferable for dissolving or dispersing an oily food in water.

This shows that, while a hydration nature is further improved by combining with the pretreatment step, such a nature is also improved by shaping into flakes or a powder alone as compared with shaping into blocks. When roll refining is used for shaping into flakes or a powder as a processing means, no additional specific steps and equipment are required, and such a processing means is effective in view of facilities and costs.

The invention claimed is:

1. A process for producing flakes for chocolate drink, which comprises subjecting a mixture of hydrophilic materials and an oil-containing material which is cacao mass, cocoa powder, or whole powdered milk, or any of cacao mass, cocoa powder, or whole powdered milk to which fats have been added, to roll refining, wherein the hydrophilic materials contain 0.05 to 10% by weight of a hydrophilic emulsifier relative to the oil-containing material, the hydrophilic emulsifier is one or more emulsifiers selected from the group consisting of sucrose fatty acid ester, glycerin fatty acid ester, polyglycerin fatty acid ester, sorbitan fatty acid ester, and propylene glycol fatty acid ester, and the amount of the hydrophilic materials is less than 30% relative to the oil-containing material.

2. The process according to claim 1, wherein the mixture is prepared by mixing with one or more kinds of a conching machine, a kneader, a ball mill and a mixer before roll refining.

3. The process according to claim 1, wherein the mixture further contains either of sugar or powdered skim milk.

4. The process according to claim 1 or 2, wherein HLB of the hydrophilic emulsifier is 5 or more.

5. The process according to claim 1 or 2, wherein the mixture contains a thickening polysaccharide, a gelling agent, or a pH adjustor.

6. The process according to claim 2, wherein the mixing is performed with warming.

7. The process according to claim 2, wherein either of sugar or powdered skim milk is added to the mixture prepared before roll refining.

* * * * *